United States Patent

Nakura et al.

(10) Patent No.: US 6,796,726 B2
(45) Date of Patent: Sep. 28, 2004

(54) OPTICAL CONNECTOR

(75) Inventors: Yuji Nakura, Nagoya (JP); Hitoshi Imazu, Nagoya (JP); Kazuhiro Asada, Nagoya (JP)

(73) Assignees: Sumitomo Wiring Systems, Ltd., Mie (JP); Autonetworks Technologies, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 130 days.

(21) Appl. No.: 10/108,627

(22) Filed: Mar. 29, 2002

(65) Prior Publication Data

US 2002/0150351 A1 Oct. 17, 2002

(30) Foreign Application Priority Data

Apr. 3, 2001 (JP) ........................................ 2001-104432

(51) Int. Cl.[7] .................................................. G02B 6/36
(52) U.S. Cl. .............................. 385/92; 385/88; 385/89; 385/94
(58) Field of Search ............................. 385/92, 53, 88, 385/89, 94

(56) References Cited

U.S. PATENT DOCUMENTS

| | | | |
|---|---|---|---|
| 4,539,476 A | * | 9/1985 | Donuma et al. ........ 250/227.24 |
| 5,233,676 A | * | 8/1993 | Yonemura et al. ............ 385/88 |
| 5,259,053 A | | 11/1993 | Schaffer et al. |
| 5,689,609 A | | 11/1997 | Tonejc |

FOREIGN PATENT DOCUMENTS

| | | |
|---|---|---|
| EP | 0 524 406 A1 | 1/1993 |
| GB | 2 239 104 A | 6/1991 |
| JP | 05 003330 | 1/1993 |
| JP | A 11-297427 | 10/1999 |
| WO | WO 98/40776 | 9/1998 |

* cited by examiner

*Primary Examiner*—Akm Enayet Ullah
*Assistant Examiner*—Sung Pak
(74) *Attorney, Agent, or Firm*—Oliff & Berridge, PLC

(57) ABSTRACT

In an optical connector, element body portions of optical elements are fittingly received respectively in receiving recesses formed in a connector housing, and lead terminals of each optical element project outwardly from the receiving recess. The connector housing is made of a metal material, and ground contact surfaces for being held in surface-to-surface contact with a grounding circuit is formed on and projects from a lower surface of the connector housing beyond which the lead terminals project outwardly, and an insulating portion made of an insulating material is formed at a peripheral edge portion of an opening of each receiving recess over an entire periphery thereof.

11 Claims, 4 Drawing Sheets

OPTICAL CONNECTOR

BACKGROUND OF THE INVENTION

1. Field of the Invention

This invention relates to an optical connector used in the field of optical communication for an OA equipment, an FA equipment, an on-vehicle equipment and so on.

2. Description of the Related Art

There is known a conventional optical connector of the type (as disclosed in JP-A-5-3330) in which in order to deal with noises, an optical element is received within a metal casing, and this casing is received with in a housing made of an insulative resin. This optical connector is of such a construction that when it is mounted on and fixed to a circuit board, the metal casing is disposed on a grounding circuit, formed on the circuit board, in order to shut off electromagnetic noises.

In order to enhance the effect of radiating heat generated from the optical element, a radiating portion is formed on the metal casing, and this radiating portion extends to the exterior of the housing.

On the other hand, in order to enhance the heat-radiating ability of the optical element, the optical element is so designed that an element body portion of the optical element can be disposed in intimate contact with an inner surface of a receiving recess in the metal casing, and an opening of the receiving recess is so sized and shaped that the element body portion of the optical element can be very closely fitted into this receiving recess.

Therefore, in order that lead terminals, projecting from the element body portion, could be connected to predetermined holes in the circuit board without contacting that portion of the metal casing, surrounding these lead terminals, the precise positioning of the optical element need to be effected at the optical element-receiving portion.

And besides, there was a possibility that a peripheral edge portion of the opening of the receiving recess in the metal casing was contacted with the circuit pattern, to which the lead terminals were connected, thus inviting short-circuiting.

SUMMARY OF THE INVENTION

This invention has been made to solve the above problems with the related art, and therefore it is an object of the invention to provide an optical connector in which without the need for strictly positioning an optical element, the short-circuiting, caused by contact of lead terminals with a connector housing/a metal casing, and the short-circuiting, caused by contact of the connector housing/the metal casing with a circuit pattern other than a grounding circuit, can be efficiently prevented.

To achieve the above object, according to one aspect of this invention, there is provided an optical connector wherein an element body portion of an optical element is fittingly received in a receiving recess formed in a connector housing, and lead terminals of the optical element project outwardly from the receiving recess; and the connector housing is made of a metal material; and a ground contact surface for being held in surface-to-surface contact with a grounding circuit is formed on and projects from a mounting side surface of the connector housing beyond which the lead terminals project outwardly; and an insulating portion, made of an insulating material, is formed at a peripheral edge portion of an opening of the receiving recess over an entire periphery thereof.

According to another aspect of the invention, there is provided an optical connector wherein an element body portion of an optical element is fittingly received in a receiving recess formed in a connector housing, and lead terminals of the optical element project outwardly from the receiving recess; and the connector housing is made of a metal material; and a ground contact surface for being held in surface-to-surface contact with a grounding circuit is formed on and projects from a mounting side surface of the connector housing beyond which the lead terminals project outwardly; and a non-contact recess is formed at a peripheral edge portion of an opening of the receiving recess over an entire periphery thereof so that when the ground contact surface is held in the surface-to-surface contact, a non-contact gap, at which the connector housing is out of contact with a mounting surface for the connector housing, is formed at the peripheral edge portion of the opening over the entire periphery thereof.

A radiating fin portion of a generally corrugated shape can be formed on an outer surface of the connector housing.

According to a further aspect of the invention, there is provided an optical connector wherein an element body portion of an optical element is fittingly received in a receiving recess formed in a metal casing, and lead terminals of the optical element project outwardly from the receiving recess, and the metal casing is received and held in a connector housing; and that side surface of the metal casing, beyond which the lead terminals project outwardly, serves as a ground contact surface for being held in surface-to-surface contact with a grounding circuit; and an insulating portion, made of an insulating material, is formed at a peripheral edge portion of an opening of the receiving recess over an entire periphery thereof.

According to a further aspect of the invention, there is provided an optical connector wherein an element body portion of an optical element is fittingly received in a receiving recess formed in a metal casing, and lead terminals of the optical element project outwardly from the receiving recess, and the metal casing is received and held in a connector housing; and that side surface of the metal casing, beyond which the lead terminals project outwardly, serves as a ground contact surface for being held in surface-to-surface contact with a grounding circuit; and a non-contact recess is formed at a peripheral edge portion of an opening of the receiving recess over an entire periphery thereof so that when the ground contact surface is held in the surface-to-surface contact, a non-contact gap is formed at the peripheral edge portion of the opening over the entire periphery thereof.

In one preferred construction, the metal casing is received and held in the connector housing in such a manner that one side surface of the metal casing is exposed to the exterior, and a radiating fin portion of a generally corrugated shape is formed on the exposed surface of the metal casing.

DETAILED DESCRIPTION OF THE PREFERRED EMBODIMENTS

Hereinafter, a description will be given in more detail of preferred embodiments of the invention with reference to the accompanying drawings.

Figure 1:
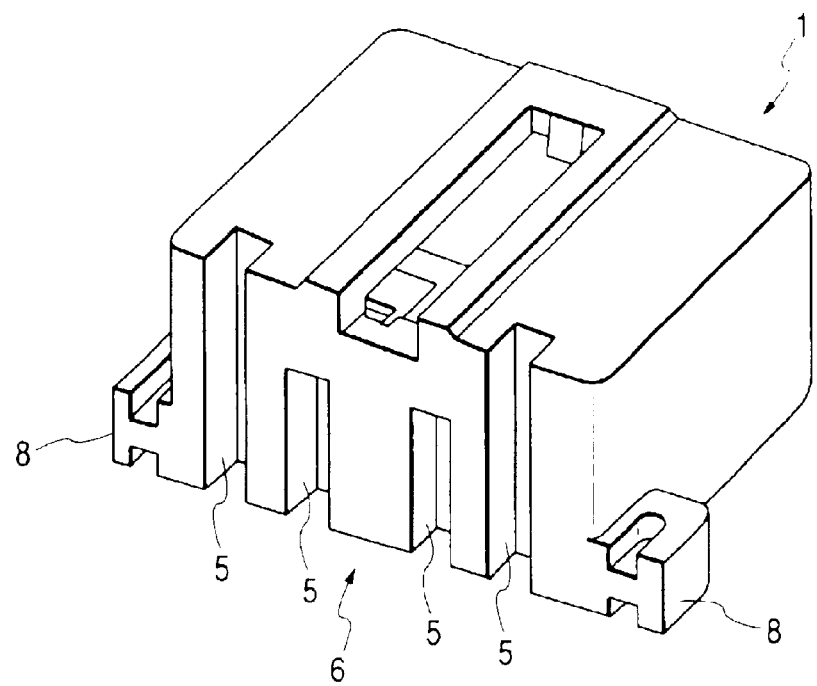
FIG. 1 is a perspective view of a connector housing of a first embodiment.
Figure 2:
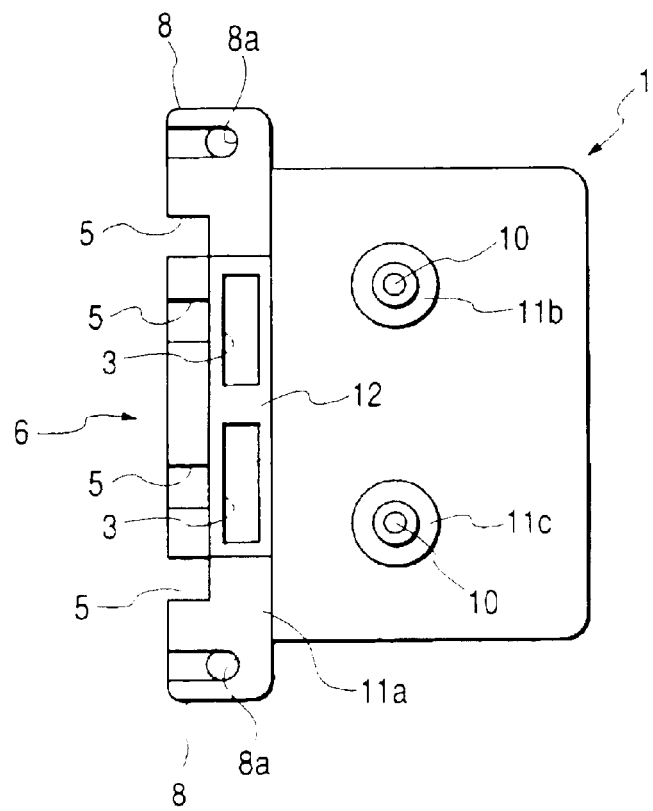
FIG. 2 is a bottom view thereof.
Figure 3:
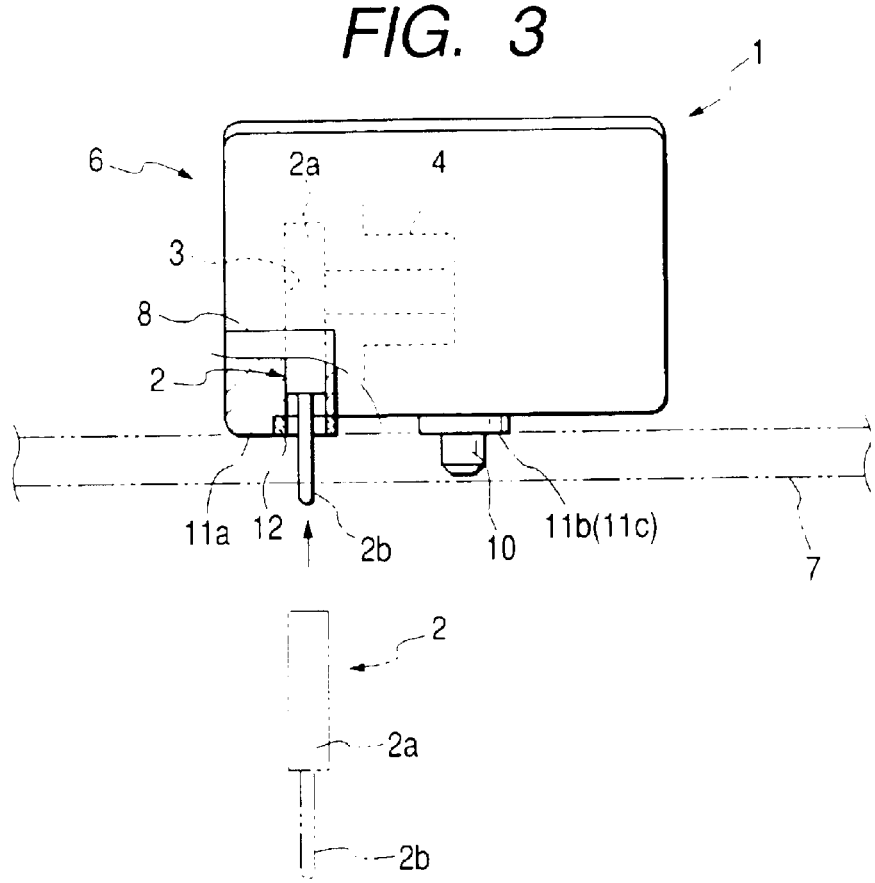
FIG. 3 is a side-elevational view of the first embodiment.

A first embodiment of the present invention will now be described with reference to the drawings. In FIGS. 1 to 3, a connector housing 1 is made of a metal material, such as aluminum and an aluminum alloy, and a pair of receiving recesses 3 for respectively receiving element body portions 2a of optical elements 2 (each comprising a light-emitting element or a light-receiving element) in a fitted manner are formed in a lower surface of this housing 1 at one side portion thereof (that is, a rear portion thereof), and are spaced from each other in a direction of a width of this housing in a juxtaposed manner.

The element body portions 2a (having a generally rectangular parallelepiped shape) of the pair of optical elements 2 are fitted in the receiving recesses 3, respectively, and in this condition lead terminals 2b of each optical element 2 project downwardly from the corresponding receiving recess 3. An outer peripheral surface of each element body portion 2a, received in the receiving recess 3, is disposed in intimate contact with an inner peripheral surface of this receiving recess 3.

Ferrule guide portions 4 of a tubular shape are formed in the connector housing 1, and are disposed respectively in registry with light-emitting or light-receiving surfaces formed respectively on front sides of the element body portions 2a fitted respectively in the receiving recesses 3.

Grooves 5 are formed in a rear surface (outer surface) of the connector housing 1, corresponding to the rear sides of the element body portions 2a fitted respectively in the receiving recesses 3, and are arranged at suitable intervals in the direction of the width, and are elongate in an upward-downward direction, so that a radiating fin portion 6 of a generally corrugated shape are formed in this outer surface of the connector housing.

Mounting portions 8, each having an internally-thread hole 8a are formed on and project respectively from lower portions of opposite side surfaces of the connector housing 1 at the rear side thereof, and the connector housing 1 can be fixedly secured to a printed board 7 by screws threaded respectively into the threaded holes 8a.

As shown in FIGS. 2 and 3, a rear region of the lower surface of the connector housing 1, which lies between the vicinity of the receiving recesses 3 and the rear side thereof, and extends in the direction of the width, projects slightly downwardly. Also, two circular regions of the lower surface, which are disposed midway between the front and rear sides of the connector housing, and are spaced from each other in the direction of the width, project slightly downwardly, and a positioning projection 10 for fitting into a corresponding positioning hole in the circuit board 7 is further formed on and projects from a central portion of each of these circular regions.

When the positioning projections 10, as well as the lead terminals 2b, are fitted respectively in predetermined portions of the circuit board 7, the above rear region and circular regions are held in surface-to-surface contact with a grounding circuit formed on the circuit board, and these regions serve as ground contact surfaces 11a, 11b and 11c, respectively.

In this case, at the rear ground contact surface 11a, an insulating portion 12, made of an insulating material, such as an insulating tape, a coating and an insulative resin, is formed in an annular manner at a peripheral edge portion of an opening, disposed at the lower open end of each receiving recess 3, over an entire periphery thereof.

This embodiment has the above construction, and when the connector housing 1 is to be fixedly mounted on the circuit board 7, the element body portions 2a of the optical elements 2 are fitted respectively in the receiving recesses 3 in the connector housing 1, and in this condition the positioning projections 10 are fitted respectively into the positioning holes in the circuit board 7, and at the same time the lead terminals 2b are inserted respectively into through holes in a predetermined circuit pattern on the circuit board 7, and the screws are passed through the circuit board 7, and are threaded respectively into the internally-threaded holes 8a formed respectively in the mounting portions 8. Then, the lead terminals 2b are connected to the predetermined circuit pattern by soldering or the like.

In this mounted condition, the ground contact surfaces 11a, 11b and 11c on the lower surface of the connector housing 1 are held in surface-to-surface contact with the grounding circuit on the circuit board 7.

As described above, in this embodiment, the element body portions 2a of the optical elements 2 are directly received respectively in the receiving recesses 3 formed in the connector housing 1 made of the metal material, and with this construction heat can be radiated through the whole of the connector housing 1, and the heat, generated from the optical elements 2, can be effectively radiated. And besides, the radiating fin portion 6 is provided in the vicinity of the region where the optical elements 2 are mounted, and therefore the radiation can be effected more efficiently.

Furthermore, the ground contact surfaces 11a, 11b and 11c on the connector housing 1 are held in surface-to-surface contact with the grounding circuit on the circuit board 7, and therefore there is achieved an advantage that excellent anti-noise properties can be obtained.

Furthermore, the connector housing 1 is mounted on and fixed to the circuit board 7 in such a manner that the optical elements 2, received in the respective receiving recesses 3, are completely enclosed, and therefore there is achieved an advantage that the excellent anti-noise properties are obtained.

The insulating portion 12, made of the insulating material, is formed at the peripheral edge portion of the opening (from which the lead terminals 2b of the optical element 2 project outwardly) of each receiving recess 3 over the entire periphery thereof, and therefore even if the lead terminal 2b accidentally contacts the peripheral edge portion of the opening because of a manufacturing error, a positioning error or others, the short-circuiting can be efficiently prevented. Therefore, without the need for strictly positioning each optical element 2 relative to the corresponding receiving recess 3 in the connector housing 1, the short-circuiting, caused by the lead terminals 2b, can be efficiently prevented.

The lower surface of the connector housing 1 except the ground contact surfaces 11a, 11b and 11c, disposed in contact with the grounding circuit on the circuit board 7, is spaced from the upper surface of the circuit board 7, and therefore despite the fact that the connector housing 1 itself is made of the metal material, the areas of contact of the connector housing with the circuit board 7 can be limited, and the short-circuiting relative to the circuit pattern on the circuit board 7 can be efficiently prevented.

And besides, the short-circuiting between the circuit pattern, to which the lead terminal 2b is connected, and the connector housing 1, can be efficiently prevented by the insulating portion 12.

Figure 4:
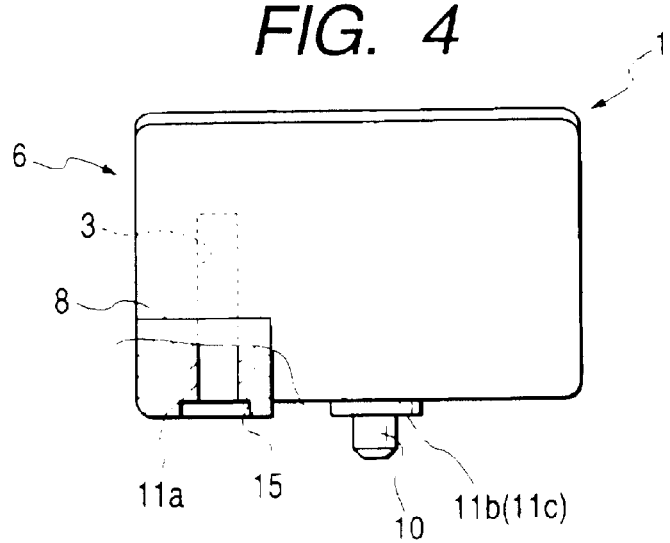
FIG. 4 is a side-elevational view of a connector housing of a second embodiment.
Figure 5:
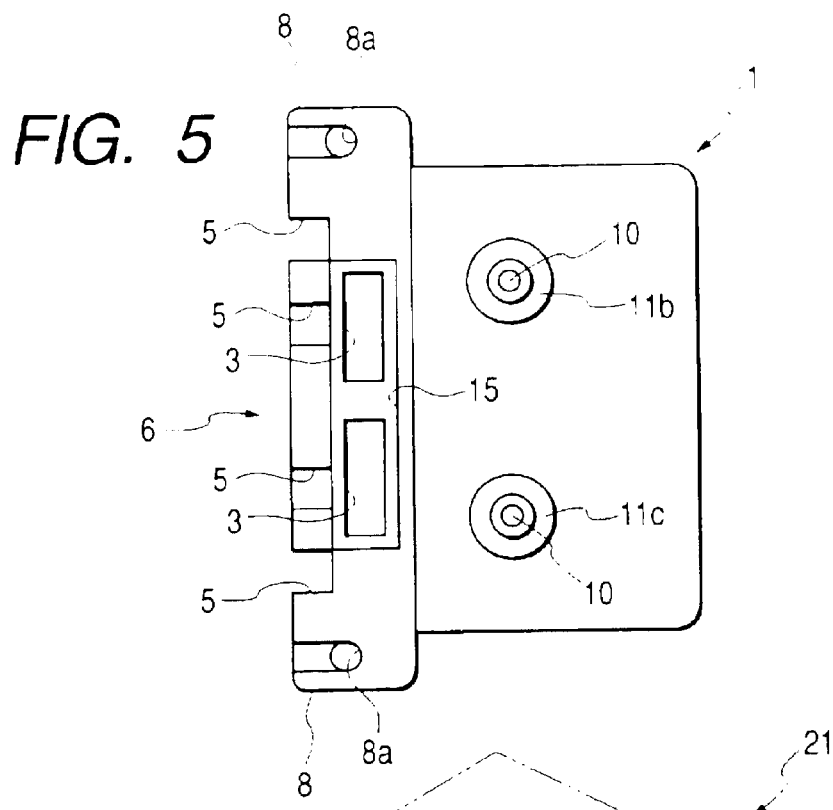
FIG. 5 is a bottom view thereof.

FIGS. 4 and 5 show a second embodiment, and those portions of this embodiment, similar in construction to those of the first embodiment, will be designated by identical reference numerals, respectively, and explanation thereof will be omitted.

In this embodiment, instead of the insulating portion 12, a non-contact recess 15 is formed in a peripheral edge portion of an opening of each receiving recess 3 over an entire periphery thereof.

Therefore, when a connector housing 1 is mounted on and fixed to a circuit board 7, a non-contact gap, at which the lower surface of the connector housing is out of contact with the circuit board 7, is formed at the peripheral edge portion of the opening of each receiving recess 3 over the entire periphery thereof.

In this embodiment, also, heat can be radiated through the whole of the connector housing 1 as in the first embodiment, and heat, generated by optical elements 2, can be effectively radiated. And besides, a radiating fin portion 6 is provided in the vicinity of the region where the optical elements 2 are mounted, and therefore the radiation can be effected more efficiently.

Furthermore, ground contact surfaces 11a, 11b and 11c of the connector housing 1 are held in surface-to-surface contact with a grounding circuit on the circuit board 7, and therefore there is achieved an advantage that excellent anti-noise properties can be obtained. And besides, the connector housing 1 is mounted on and fixed to the circuit board 7 in such a manner that the optical elements 2, received in the respective receiving recesses 3, are completely enclosed, and therefore there is achieved an advantage that the excellent anti-noise properties are obtained.

The non-contact recess 15 is formed in the peripheral edge portion of the opening (from which lead terminals 2b of the optical element 2 project outwardly) of each receiving recess 3 over the entire periphery thereof, and therefore even if the lead terminal 2b accidentally contacts the peripheral edge portion of the opening because of a manufacturing error, a positioning error or others, the short-circuiting can be efficiently prevented. Therefore, without the need for strictly positioning each optical element 2 relative to the corresponding receiving recess 3 in the connector housing 1, the short-circuiting, caused by the lead terminals 2b, can be efficiently prevented.

The lower surface of the connector housing 1 except the ground contact surfaces 11a, 11b and 11c, disposed in contact with the grounding circuit on the circuit board 7, is spaced from the upper surface of the circuit board 7, and therefore despite the fact that the connector housing 1 itself is made of a metal material, the areas of contact of the connector housing with the circuit board 7 can be limited, and the short-circuiting relative to the circuit pattern on the circuit board 7 can be efficiently prevented.

And besides, the short-circuiting between the circuit pattern, to which the lead terminal 2b is connected, and the connector housing 1, can be efficiently prevented by the non-contact recess 15.

Figure 6:
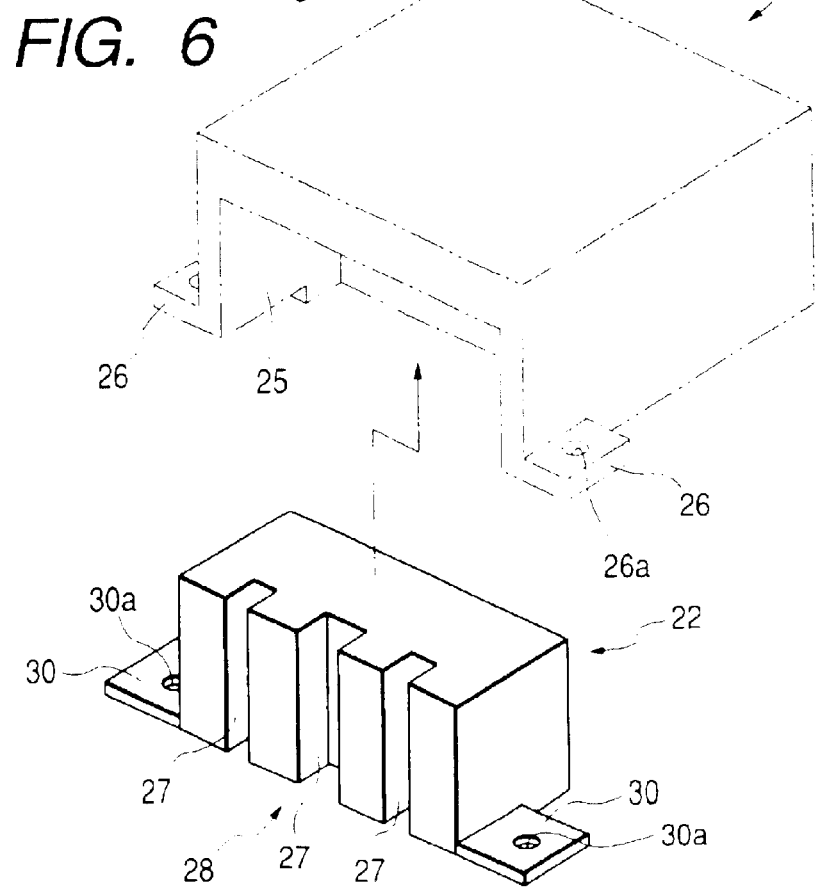
FIG. 6 is a view explanatory of a third embodiment.
Figure 7:
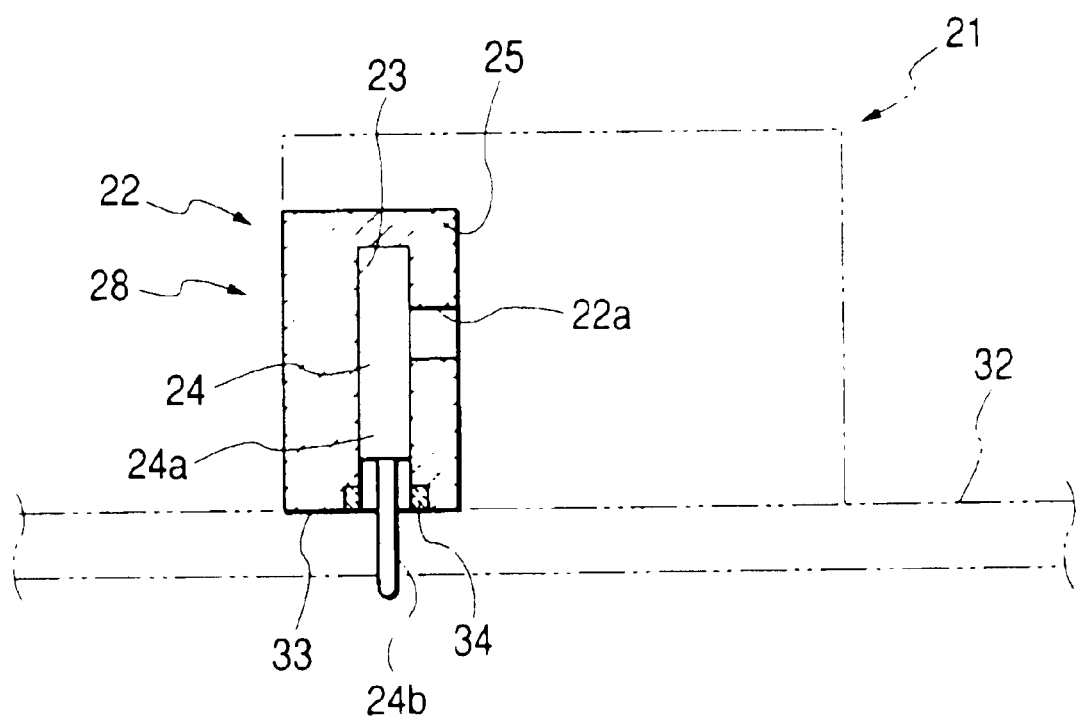
FIG. 7 is a side-elevational, cross-sectional view thereof.

FIGS. 6 and 7 show a third embodiment, and an optical connector comprises a connector housing 21, made of an insulative resin or the like, a block-like metal casing 22, made of a metal material such as aluminum and an aluminum alloy, and optical elements 24 (each comprising a light-emitting element or a light-receiving element) received respectively in receiving recesses 23, formed in the metal casing 22, in a fitted manner.

A rearwardly-open casing-receiving portion 25, in which the metal casing 22 can be received in a fitted manner, is formed in a rear portion of the connector housing 21. Mounting piece portions 26 are formed on and project respectively from lower portions of opposite side surfaces of the connector housing 21 at the rear side thereof, and an internally-threaded hole 26a, into which a screw can be threaded, is formed through each of these mounting piece portions 26.

The pair of receiving recesses 23 are formed in a lower surface of the metal casing 22, and are spaced from each other in a direction of a width there of in a juxtaposed manner. Element body portions 24a (having a generally rectangular parallelepiped shape) of the optical elements 24 are fitted in the receiving recesses 23, respectively, and in this condition lead terminals 24b of each optical element 24 project downwardly from the corresponding receiving recess 23. An outer peripheral surface of each element body portion 24a, received in the receiving recess 23, is disposed in intimate contact with an inner peripheral surface of this receiving recess 23.

Window portions 22a are formed in the metal casing 22, and are disposed respectively in registry with light-emitting or light-receiving surfaces formed respectively on front sides of the element body portions 24a fitted respectively in the receiving recesses 23.

Grooves 27 are formed in a rear surface (outer surface) of the metal casing 22, corresponding to the rear sides of the element body portions 24a fitted respectively in the receiving recesses 23, and are arranged at suitable intervals in the direction of the width, and are elongate in an upward-downward direction, so that a radiating fin portion 28 of a generally corrugated shape are formed in this outer surface of the metal casing 22.

Mounting piece portions 30, corresponding respectively to the mounting piece portions 26 of the connector housing 21, are formed on and project respectively from lower portions of opposite side surfaces of the metal casing 22, and screw passage holes 30a, corresponding respectively to the internally-threaded holes 26a formed respectively in the mounting, piece portions 26, are formed through the mounting piece portions 30, respectively.

When the metal casing 22 is received in the casing receiving recess 25 in the connector housing 21, each mounting piece portion 26 is superposed on the corresponding mounting piece portion 30, with the internally-threaded hole 26a communicating with the screw passage hole 30a.

The lower surface of the metal casing 22 serves as a ground contact surface 33a for being held in surface-to-surface contact with a grounding circuit formed on a circuit board 32. At the ground contact surface 33, an insulating portion 34, made of an insulating material, such as an insulating tape, a coating and an insulative resin, is formed in an annular manner at a peripheral edge portion of an opening, disposed at a lower open end of each receiving recess 23, over an entire periphery thereof.

This embodiment has the above construction, and when the optical connector is to be fixedly mounted on the circuit board 32, the element body portions 24a of the optical elements 24 are fitted respectively in the receiving recesses 23 in the metal casing 22, and this metal casing 22 is fitted in the casing receiving recess 25 in the connector housing 21. In this condition, the lead terminals 24b are inserted respectively into corresponding through holes in a predetermined circuit pattern on the circuit board 32, and the screws are passed through the circuit board 32, and are further passed respectively through the screw passage holes 30a, formed respectively through the mounting piece portions 30, and are threaded respectively into the internally-threaded holes 26a formed respectively through the mounting piece portions 26. Then, the lead terminals 24b are connected to the predetermined circuit pattern by soldering or the like.

In this mounted condition, the ground contact surface 33 on the lower surface of the metal casing 22 is held in surface-to-surface contact with the grounding circuit on the circuit board 32.

As described above, in this embodiment, the element body portions 24a of the optical elements 24 are received respectively in the receiving recesses 23 formed in the metal casing 22, and with this construction heat can be radiated through the whole of the metal casing 22, and the heat, generated from the optical elements 24, can be effectively radiated. And besides, the metal casing 22 has the radiating fin portion 28 exposed to the exterior, and therefore the radiation can be effected more efficiently.

Furthermore, the ground contact surface 33 on the lower surface of the metal casing 22 is held in surface-to-surface contact with the grounding circuit on the circuit board 32, and therefore there is achieved an advantage that excellent anti-nose properties can be obtained.

Furthermore, the metal casing 22 is mounted on and fixed to the circuit board 32 in such a manner that the optical elements 24, received in the respective receiving recesses 33, are completely enclosed, and therefore there is achieved an advantage that the excellent anti-noise properties are obtained.

The insulating portion 34, made of the insulating material, is formed at the peripheral edge portion of the opening (from which the lead terminals 24b of the optical element 24 project outwardly) of each receiving recess 23 over the entire periphery thereof, and therefore even if the lead terminal 24b accidentally contacts the peripheral edge portion of the opening because of a manufacturing error, a positioning error or others, the short-circuiting can be efficiently prevented. Therefore, without the need for strictly positioning each optical element 24 relative to the corresponding receiving recess 23 in the metal casing 22, the short-circuiting, caused by the lead terminals 24b, can be efficiently prevented.

And besides, the short-circuiting between the circuit pattern, to which the lead terminal 24b is connected, and the metal casing 22, can be efficiently prevented by the insulating portion 34.

In this third embodiment, each insulating portion 34 may be replaced by a non-contact recess which is formed in the peripheral edge portion of the opening of the corresponding receiving recess 23 over the entire periphery thereof as described above for the second embodiment. With this construction, when the optical connector is mounted on and fixed to the circuit board 32, a non-contact gap, at which the lower surface of the metal casing is out of contact with the circuit board 32, is formed at the peripheral edge portion of the opening of each receiving recess 23 over the entire periphery thereof. In this case, also, similar effects as described above can be achieved.

In the above embodiments although with respect to the optical elements 2, 24, the two-pole type constructions have been described, the present invention can be applied to a single pole-type or a three or more pole-type construction.

As described above, in the optical connector of the present invention, the connector housing is made of a metal material, and the ground contact surface for being held in surface-to-surface contact with the grounding circuit is formed on and projects from the mounting side surface of the connector housing beyond which the lead terminals project outwardly, and the insulating portion, made of an insulating material, is formed at the peripheral edge portion of the opening of the receiving recess over the entire periphery thereof. With this construction, there is achieved an advantage that without the need for strictly positioning the optical element, the short-circuiting, caused by contact of the lead terminals with the connector housing, and the short-circuiting, caused by contact of the connector housing with other circuit pattern than the grounding circuit, can be efficiently prevented.

The connector housing is made of a metal material, and the ground contact surface for being held in surface-to-surface contact with the grounding circuit is formed on and projects from the mounting side surface of the connector housing beyond which the lead terminals project outwardly, and the non-contact recess is formed at the peripheral edge portion of the opening of the receiving recess over the entire periphery thereof so that when the ground contact surface is held in the surface-to-surface contact, the non-contact gap, at which the connector housing is out of contact with the mounting surface for the connector housing, is formed at the peripheral edge portion of the opening over the entire periphery thereof. With this construction, also, there is achieved an advantage that without the need for strictly positioning the optical element, the short-circuiting, caused by contact of the lead terminals with the connector housing, and the short-circuiting, caused by contact of the connector housing with other circuit pattern than the grounding circuit, can be efficiently prevented.

The radiating fin portion of a generally corrugated shape is formed on the outer surface of the connector housing, and with this construction, there is achieved an advantage that the heat radiation can be effected efficiently.

That side surface of the metal casing, beyond which the lead terminals project outwardly, serves as the ground contact surface for being held in surface-to-surface contact with the grounding circuit, and the insulating portion, made of an insulating material, is formed at the peripheral edge portion of the opening of the receiving recess over the entire periphery thereof. With this construction, there is achieved an advantage that without the need for strictly positioning the optical element, the short-circuiting, caused by contact of the lead terminals with the metal casing, and the short-circuiting, caused by contact of the metal casing with other circuit pattern than the grounding circuit, can be efficiently prevented.

That side surface of the metal casing, beyond which the lead terminals project outwardly, serves as the ground contact surface for being held in surface-to-surface contact with the grounding circuit, and the non-contact recess is formed at the peripheral edge portion of the opening of the receiving recess over the entire periphery thereof so that when the ground contact surface is held in the surface-to-surface contact, the non-contact gap is formed at the peripheral edge portion of the opening over the entire periphery thereof. With this construction, also, there is achieved an advantage that without the need for strictly positioning the optical element, the short-circuiting, caused by contact of the lead terminals with the metal casing, and the short-circuiting, caused by contact of the metal casing with other circuit pattern than the grounding circuit, can be efficiently prevented.

The metal casing is received and held in the connector housing in such a manner that one side surface of the metal casing is exposed to the exterior, and the radiating fin portion of a generally corrugated shape is formed on the exposed surface of the metal casing. With this construction, there is achieved an advantage that the heat radiation can be effected efficiently.

What is claimed is:

1. An optical connector, comprising:

a connector housing having a receiving recess; and an optical element having an element body portion that is fittingly received in the receiving recess formed in said connector housing, and lead terminals that project outwardly from said receiving recess, wherein said connector housing is made of a metal material;

wherein a ground contact surface which is held in surface-to-surface contact with a grounding circuit is formed on and projects from a mounting side surface of said connector housing beyond which said lead terminals project outwardly; and wherein an insulating portion made of an insulating material is formed at a peripheral edge of an opening of said receiving recess over an entire periphery thereof.

2. An optical connector, comprising:

a connector housing having a receiving recess; and an optical element having an element body portion that is fittingly received in the receiving recess formed in said connector housing, and lead terminals that project outwardly from said receiving recess, wherein said connector housing is made of a metal material;

wherein a ground contact surface which is held in surface-to-surface contact with a grounding circuit is formed on and projects from a mounting side surface of said connector housing beyond which said lead terminals project outwardly; and wherein a non-contact recess is formed at a peripheral edge of an opening of said receiving recess over an entire periphery thereof so that when said ground contact surface is held in said surface-to-surface contact, a non-contact gap, at which said connector housing is out of contact with a mounting surface for said connector housing, is formed at the peripheral edge of said opening over the entire periphery thereof.

3. The optical connector according to claim 1, wherein said connector housing has a radiating fin portion of a generally corrugated shape formed on an outer surface thereof.

4. The optical connector according to claim 2, wherein said connector housing has a radiating fin portion of a generally corrugated shape formed on an outer surface thereof.

5. An optical connector, comprising:

a metal casing having a receiving recess;

an optical element having an element body portion which is fittingly received in the receiving recess formed in said metal casing, and lead terminals which project outwardly from the receiving recess; and a connector housing that receives and holds said metal casing, wherein a side surface of said metal casing, beyond which said lead terminals project outwardly, serves as a ground contact surface that is held in surface-to-surface contact with a grounding circuit; and wherein an insulating portion made of an insulating material is formed at a peripheral edge of an opening of said receiving recess over an entire periphery thereof.

6. An optical connector, comprising:

a metal casing having a receiving recess;

an optical element having an element body portion which is fittingly received in the receiving recess formed in said metal casing, and lead terminals which project outwardly from the receiving recess; and a connector housing that receives and holds said metal casing, wherein a side surface of said metal casing, beyond which said lead terminals project outwardly, serves as a ground contact surface which is held in surface-to-surface contact with a grounding circuit;

wherein a non-contact recess is formed at a peripheral edge of an opening of said receiving recess over an entire periphery thereof, so that when said ground contact surface is held in said surface-to-surface contact, a non-contact gap is formed at the peripheral edge of said opening over the entire periphery thereof.

7. The optical connector according to claim 6, wherein:

said metal casing is received and held in said connector housing with one side surface of said metal casing exposed to the exterior; and a radiating fin portion of a generally corrugated shape is formed on said exposed surface of said metal casing.

8. The optical connector as in claim 1, wherein said insulating portion is held in surface-to-surface contact with the mounting side surface.

9. The optical connector according to claim 5, wherein:

said metal casing is received and held in said connector housing with one side surface of said metal casing exposed to the exterior; and a radiating fin portion of a generally corrugated shape is formed on said exposed surface of said metal casing.

10. The optical connector according to claim 5, wherein the connector housing is made of a metal material.

11. The optical connector according to claim 6, wherein the connector housing is made of a metal material.

* * * * *